[15.] 2 Sheets--Sheet 1.
EDWARD L. BAKER, HENRY KNIGHT & EDWIN DAYTON.
Machines for Making Cement Pipe.
No. 4,563. Reissued Sep. 19, 1871.
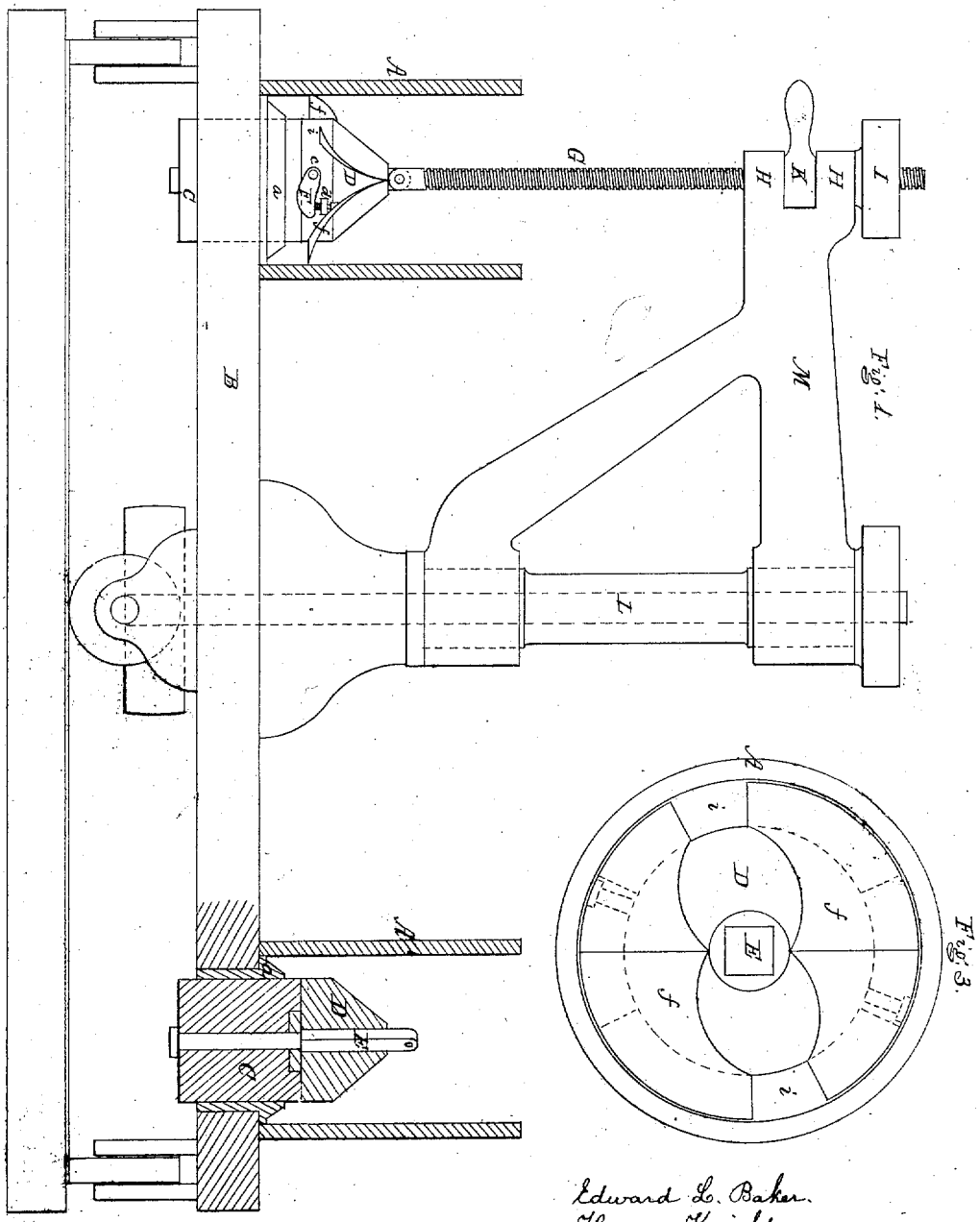
Witnesses { Mo. W. Frothingham. S. B. Kidder.
Edward L. Baker.
Henry Knight.
Edwin Dayton.
By their Attys.
Crosby & Gould

[15.] 2 Sheets--Sheet 2.
EDWARD L. BAKER, HENRY KNIGHT & EDWIN DAYTON.
Machines for Making Cement Pipe.
No. 4,563. Reissued Sep. 19, 1871.
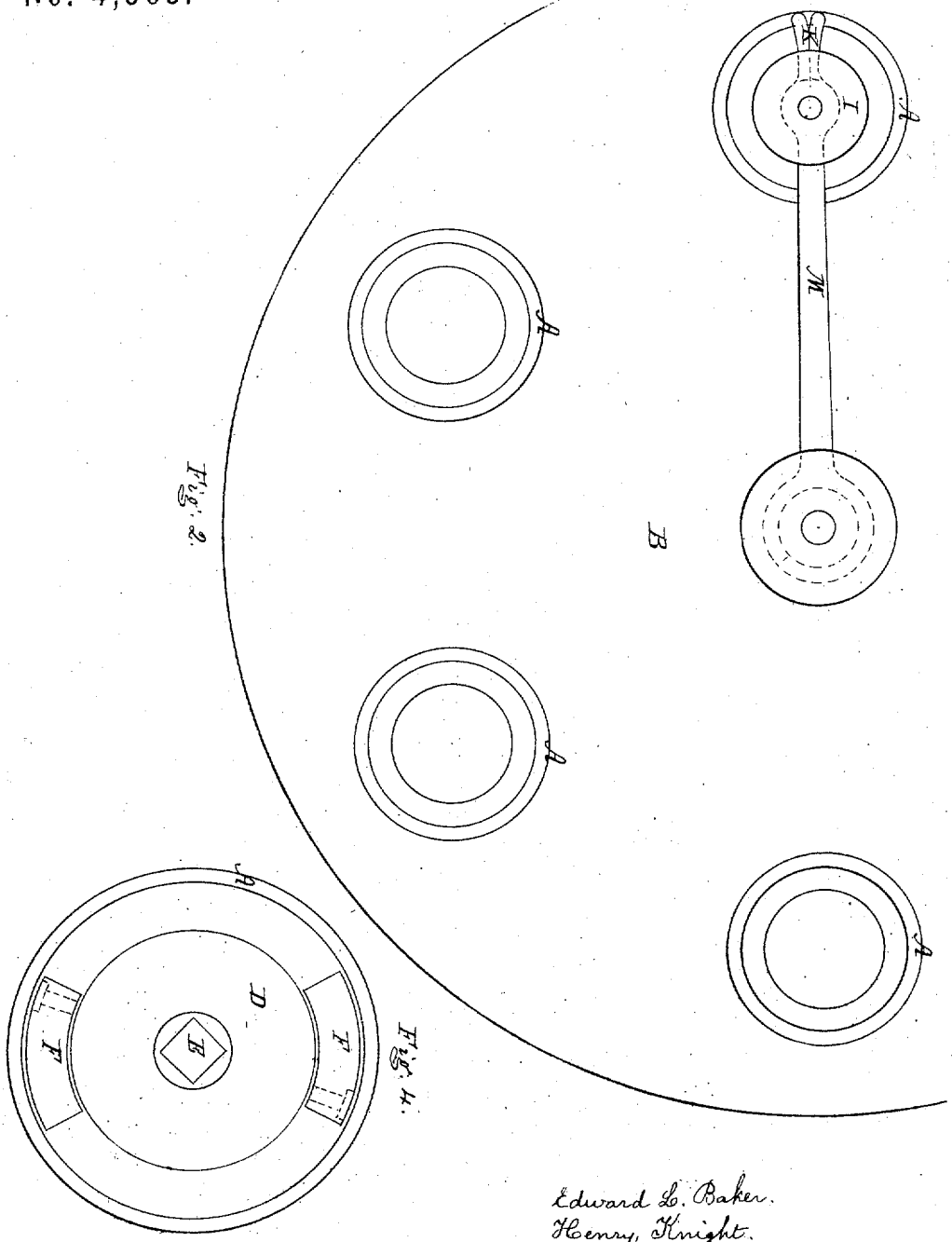
Witnesses { M. M. Frothingham. S. B. Kidder.
Edward L. Baker.
Henry Knight.
Edwin Dayton.
By their Attys.
Osgood & Gould

UNITED STATES PATENT OFFICE.

EDWARD L. BAKER, OF BOSTON, MASSACHUSETTS, HENRY KNIGHT, OF BROOKLYN, NEW YORK, AND EDWIN DAYTON, OF MERIDEN, CONNECTICUT, ASSIGNEES, BY MESNE ASSIGNMENTS, OF WILLIAM GOODWIN.

IMPROVEMENT IN MACHINES FOR MAKING CEMENT PIPES.

Specification forming part of Letters Patent No. 49,828, dated September 5, 1865; antedated August 28, 1865; reissue No. 4,563, dated September 19, 1871.

*To all whom it may concern:*

Be it known that WILLIAM GOODWIN, of New Haven, in the county of New Haven and State of Connecticut, has invented an Improvement in Machines for Making Cement Pipe; and we hereby declare that the following, taken in connection with the drawing which accompanies and forms part of this specification, is a description of the invention sufficient to enable those skilled in the art to practise it.

The invention relates particularly to the manufacture of that class of drain or water-pipe in the composition of which hydraulic cement forms a principal ingredient. Such pipes are mostly made by feeding the cement gradually into the top of a flask between the flask and core, and packing the cement as the flask fills, generally by tamping, but sometimes by the use of rolls; and the invention consists primarily in the employment of one or more rotary shoes or trowels, which fill or extend across the space between the core and flask, and compress the cement as they rotate.

The drawing represents a machine embodying the invention. Figure 1 is a sectional elevation of the machine. Fig. 2 is a plan of it. Figs. 3 and 4 are details made to illustrate the operation and construction of some of the working parts of the improvement.

A is a flask, supported upon a base or table, B, the internal diameter of the flask being the same as the external diameter of the pipe to be formed within it. Resting upon the table B, within and at the bottom of the flask, is a ring, *a*, shaped to form one end of the pipe, the shape being preferably that best adapted to the formation of a perfect joint between two sections of pipe. C is a core, constructed in the following manner, and designed to rise during the process of charging the flask. The core is preferably formed of metal, and of a diameter corresponding to the interior of the pipe to be made. Upon the top of the core is placed a head, D, as seen in Fig. 1, so that it may be rotated without rotating the core, a spindle, E, being shown as passing axially through the two, a square shank on the spindle passing through the head, and a round part through the core, as indicated in the said Fig. 1, the head being made to rotate as hereinafter described. To the said head we joint one or more shoes, F, (see Figs. 1 and 4,) the shoes being wide enough to nearly fill the space between the core and case, as shown in Fig. 4, so that they may bear upon or across the whole surface of the stock. The shoes or trowels are preferable to rolls, as with rolls that part of the stock next to the case cannot well be reached. Each shoe is hung to the head D upon a pivot, *c*, and each may be adjusted by a screw, *d*, as more or less inclination is required. The spindle E is jointed or attached to the bottom of a rotating rod or shaft, G, the rotation of the shaft imparting corresponding rotative movements to the core-head D. The shaft G is supported in suitable boxes H H, and bears a pulley, I, to which rotary movement is imparted from any suitable power. As the stock is fed into the top of the flask the rotating shoes pass over it and press it down, and as the charge increases the shoes gradually rise, drawing up the core until the flask is filled. The shaft may then be detached from the head and the head removed from the flask, and the upper end of the pipe may then be shaped the reverse of the lower end, so that the adjacent sections will fit together, this shaping being done in any convenient manner.

To make the machine self-feeding, or to regulate the quantity of stock operated upon at each revolution of the shoes, we form a metallic flange, *f*, on the head over the shoes, this flange filling the flask except a small space, *i*, in front of each shoe, as seen in Figs. 1 and 3, through which space the stock falls as the head revolves, the space *i* regulating the quantity of stock, as only so much will pass through as can pass under the flange. By depressing the shoe the depth of the stock will be proportionately increased, and by raising the shoe the depth will be lessened.

After the pipe is finished the core may be drawn out, or may be lowered by means of a screw cut upon the shaft G, revolving in a hinged nut, K. This nut, as seen in Fig. 2, may be opened or closed to engage or disengage the screw for the purpose above mentioned. If necessary, the same screw may be used to raise the core and shoes during the operation of filling.

In practicing the invention we prefer to arrange several flasks, A, around a central column, L, which supports a crane, M, on which are the bearings H, and through the said column we extend the driving-shaft by which to convey power to the pulley I. When one section is completed we carry the core to the next flask by swinging the crane having the core suspended from it, passing from flask to flask as each is finished; or, instead of swinging the crane, the table B may be set upon trucks so as to turn; but we prefer the swinging crane, except in places where it is desirable to take the finished pipes all away at one point, in which case the table will be best. We therefore illustrate the two combined in one machine.

We claim—

1. The rotary shoe or shoes F, combined with a core and flask, substantially as described.

2. The combination of the flange *f* with a revolving head, substantially as and for the purpose specified.

3. The arrangement of the crane M in combination with one or more flasks, constructed to operate substantially as and for the purpose specified.

4. The combination of the crane M, table B, and two or more flasks, substantially as and for the purpose specified.

EDW. L. BAKER.

Witnesses to E. L. BAKER:
FRANCIS GOULD,
M. W. FROTHINGHAM.

HENRY KNIGHT.

Witnesses to H. KNIGHT:
EDWARD F. WILSON,
H. C. KNIGHT.

EDWIN DAYTON.

Witnesses to E. DAYTON:
GEO. W. SMITH,
CHARLES H. SHAW.

(15.)